No. 840,598. PATENTED JAN. 8, 1907.
J. B. TUTTLE.
FISHING TACKLE.
APPLICATION FILED JULY 5, 1906.
2 SHEETS—SHEET 1.
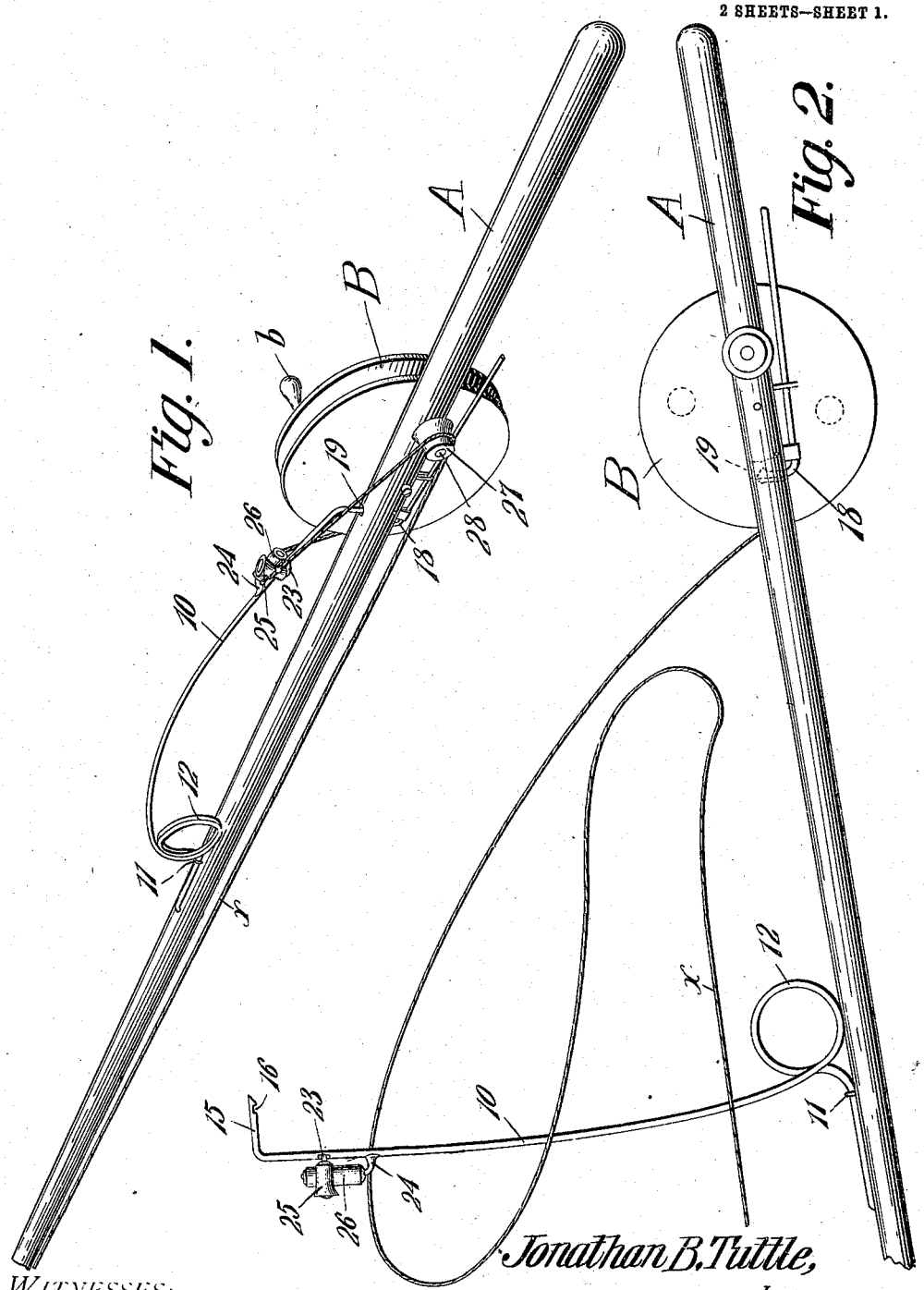
Jonathan B. Tuttle,
INVENTOR.
WITNESSES:
By C. A. Snow & Co.
ATTORNEYS

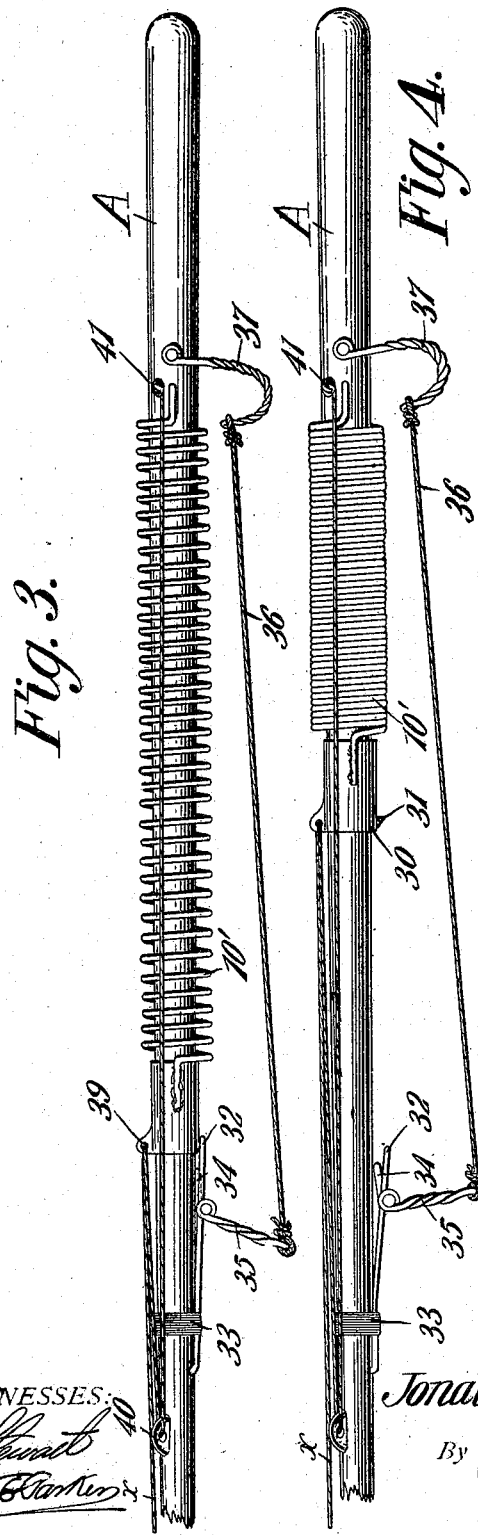

UNITED STATES PATENT OFFICE.

JONATHAN B. TUTTLE, OF CLAREMONT, CALIFORNIA.

FISHING-TACKLE.

No. 840,598. Specification of Letters Patent. Patented Jan. 8, 1907.

Application filed July 5, 1906. Serial No. 324,911.

*To all whom it may concern:*

Be it known that I, JONATHAN B. TUTTLE, a citizen of the United States, residing at Claremont, in the county of Los Angeles and State of California, have invented a new and useful Fishing-Tackle, of which the following is a specification.

This invention relates to fishing-tackle, and has for its principal object to provide a means whereby a sharp pull may be automatically exerted on the line as soon as the fisherman feels a fish at the hook or when he observes a fish immediately over a snag-hook when snag-fishing.

A further object of the invention is to provide a line-pulling device which may be readily attached to the rod and connected to the fishing-line at any point, so that the fisherman may first lower the baited hook or snag-hook to any desired depth and then connect the line to the device which forms the subject of the present invention.

A still further object of the invention is to provide a device of this class in which the take-up spring is so connected to the line as to pull upward a length of line much greater than the distance through which the spring moves.

With these and other objects in view, as will more fully hereinafter appear, the invention consists in certain novel features of construction and arrangement of parts, hereinafter fully described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is a perspective view of a portion of a fishing-rod provided with a line-pulling device constructed in accordance with the invention. Fig. 2 is a side elevation of the same, showing the position assumed by the parts after the operation of the device. Fig. 3 is a side elevation illustrating a modified construction, in which a different form of spring is employed. Fig. 4 is a view corresponding to Fig. 3, showing the spring retracted. Fig. 5 is a side elevation of a portion of a fishing-rod, showing a still further modification of the line-pulling device.

Similar numerals of reference are employed to indicate corresponding parts throughout the several figures of the drawings.

The fishing-pole A may be of any size and is provided near the handle end with a line-reel B, of any desired construction, the reel in the present instance being shown in the form of a small disk having a peripheral line-receiving groove and the disk carrying a small operating-handle b.

In the preferred construction (illustrated in Figs. 1 and 2) the line-pulling spring 10 is formed of a piece of spring-wire, one end of which is rigidly secured to the pole by a staple 11 or other suitable connecting means. The wire is turned to form a number of coils 12, which tend normally to move the free end of the spring from the position shown in Fig. 1 to that illustrated in Fig. 2. The free end of the spring is turned to form an arm 15, having a notch 16 for the reception of a finger-actuating catch-lever 18, the latter being pivoted to the under side of the pole and the arm and arm-engaging end of the catch-spring extending into an opening 19 that is formed through the pole. The rear end of the catch-lever forms a handle which may be engaged by the fisherman and forced in the direction of the pole proper for the purpose of releasing the catch and allowing the spring to move from the position shown in Fig. 1 to the position shown in Fig. 2 when it is desired to exercise a sharp pull on the line. Near the free end of the spring are secured two bracket-arms 23 and 24, which carry small rollers 25 and 26, respectively, these rollers being arranged with their axes at a right angle to each other and serving to guide the line over the forward end or side of the reel or up over the spring in the manner clearly shown in Fig. 1. The line is thence passed rearward and extends partly around a roller 27, that is mounted on a pin 28 projecting from one side of the rod. This roller has a tapered or conical face to permit the free discharge of the line therefrom as the spring moves upward.

In the operation of this device the free end of the spring is first depressed until it engages with the catch 18. The hook is then lowered in the water to the desired depth and the line is turned over the roller 27 and thence over the two rollers 25 and 26 and passes to the reel, the latter being turned in the usual manner to take up any slack, so that after adjustment the hook will hang in the water at the desired depth. When it is desired to exercise a sharp pull on the line, the fisherman presses the catch-lever 18 to release position and the spring moves quickly upward to the position shown in Fig. 2. During this movement the bight of the line which passes over the rollers 25 and 26 will be thrown forward on the spring, and this slight slackening will immediately result in releasing the bight of the line from the roller 27, the line after the sharp pull has been exerted moving approximately to the free position, (shown in Fig. 2,) and then by rapidly turning the reel the slack may be quickly taken up and the line held taut in order to reel in the fish, or the operation may proceed in the ordinary manner in accordance with the character of the catch.

In the construction shown in Figs. 3 and 4 the spring 10' is in the form of a helical tension-spring, the rear end of which is secured to the fishing-rod, while the forward end of said spring is secured to a slidable collar 30, that is mounted on the rod. This collar has a projecting lug 31 at one side for engagement by a spring-catch 32, that is connected to the rod in any suitable manner, as by the finger 33. To the catch is pivoted a releasing device in the form of a lever having two arms 34 and 35, the arm 34 pressing against the rod proper, while the arm 35 is connected by a flexible cord or chain 36 to a thumb-actuated trigger member 37, that is pivoted to the rod at a point adjacent to the handled end of the lever. The fishing-line x in this case is passed through an eye 39 at the front end of the collar and thence passes through an eye 40, that is rigidly attached to the rod, while the end of the line goes to the reel or, as shown in the present instance, its ends may be securely attached to the rod, as at 41.

Where the construction shown in Figs. 3 and 4 is employed, a fisherman pulls forward on the trigger 47, when a quick pull is exerted on the line. This movement is transmitted to the flexible member 36, to the releasing-lever 34 and 35, and the catch 32 is moved outward from engagement with the lug 31, allowing the spring to retract. As the eye 39 is moved away from the eye 40 a length of line will be taken up approximately equal to twice the distance which the spring contracted.

In the construction shown in Fig. 5 a compression-spring 10ª is employed, one end of the spring being rigidly connected to the pole, as at 50, while the outer end is connected to a slidable collar 51. This collar is provided with a rearwardly-extending arm 52, having an opening for the reception of a locking-pin 53, that extends from the rod, and the end of the strip is turned outward to form a handle 54 for convenience in retracting the spring and engaging the strip with the locking-pin. The strip is disengaged by an operating-lever 55, pivoted on a pin 56 under the rod, and by depressing the handled end of the lever the strip may be forced outward and released from the pin for the purpose of allowing the spring to expand and take up the line. In this case the line x passes around a guide-sheave 58, carried by the rod, and thence around a second sheave 59, that is carried by the sleeve 51, the end of the line being thence carried to the reel. When the releasing-lever 55 is actuated and the strip 52 is moved outward from engagement with the pin 53, the spring will jump forward, carrying the collar 51 and the reel 59, so that a quick sharp upward pull will be exerted on the line in order to hook the fish. It is obvious that other forms of springs may be employed for accomplishing the result and that the length of line taken up will depend on the number of turns or bights of the line and the point of attachment of the spring.

I claim—

1. In fishing-tackle, a rod, a spring supported thereby, and line-guides, one of which is carried by the rod and the other by the spring, said guides serving to multiply the action of the spring during the time the latter is taking up the line.

2. In a fishing-tackle, a rod, a spring having a given length of retractile movement, and guides around which the line may pass, one of said guides being carried by the rod and the other being carried by and movable with the spring, said guides serving to multiply the action of the spring during the time the latter is taking up the line.

3. In fishing-tackle, a spring for imparting a quick, sharp pull on the line, means for securing one end of the spring to the rod, a catch for engaging the free end of the spring and holding said spring under stress, a pair of line-guiding rollers supported by the spring, and a line-guiding roller supported by the rod and having a tapered periphery.

4. In fishing-tackle, a spring formed of a section of wire that is coiled helically near one end, means for attaching the coiled end of the spring to the rod, a recessed arm arranged at the free end of the spring, a manually-operable latch-lever arranged to engage the recessed arm and hold the spring under stress, a pair of brackets projecting from the spring, line-guiding rollers mounted on said brackets and arranged with their axes at a right angle to each other, and a line-guiding roller carried by the rod and provided with a tapered periphery.

In testimony that I claim the foregoing as my own I have hereto affixed my signature in the presence of two witnesses.

JONATHAN B. TUTTLE.

Witnesses:
C. V. BIRB,
T. C. MURRIN.